United States Patent [19]
Fohl et al.

[11] Patent Number: 5,971,578
[45] Date of Patent: Oct. 26, 1999

[54] LIGHT TRAP FOR A LASER-BASED FIBER OPTIC VEHICLE LIGHTING SYSTEM

[75] Inventors: Timothy Fohl, Carlisle, Mass.; Michael Anthony Marinolli, Northville; Jeffrey Thomas Remillard, Ypsilanti, both of Mich.

[73] Assignee: Ford Global Technologies, Inc., Dearborn, Mich.

[21] Appl. No.: 08/887,776

[22] Filed: Jul. 3, 1997

[51] Int. Cl.[6] ....................... F21V 8/00
[52] U.S. Cl. .................. 362/581; 362/511; 385/139
[58] Field of Search .................. 362/511, 581; 385/139, 31, 140

[56] References Cited

U.S. PATENT DOCUMENTS

| | | | |
|---|---|---|---|
| 3,874,783 | 4/1975 | Cole | 385/54 |
| 4,790,618 | 12/1988 | Abe . | |
| 4,994,791 | 2/1991 | Taylor | 340/578 |
| 5,087,109 | 2/1992 | Ishizuka et al. | 385/34 |
| 5,107,533 | 4/1992 | Jaskie | 385/18 |
| 5,483,427 | 1/1996 | Dealey, Jr. et al. | 362/485 |
| 5,500,911 | 3/1996 | Roff | 385/33 |
| 5,633,963 | 5/1997 | Rickenbach et al. | 385/139 X |

FOREIGN PATENT DOCUMENTS 81805  7/1981  Japan .

*Primary Examiner*—Stephen Husar
*Attorney, Agent, or Firm*—Steven A. Maynard

[57] ABSTRACT

A fiber optic light guide for a vehicle lighting system has a light transmissive core and a light absorptive cladding provided circumferentially about the core. The light guide has a pair of end portions with opposing canted parallel end surfaces. The end surfaces are canted at a predetermined angle greater than the critical angle associated with the light transmissive core material and the surrounding air, so that if the end surfaces are separated light will not be emitted from the fiber optic light guide, but rather reflected off an end surface and into the light absorptive cladding.

16 Claims, 2 Drawing Sheets

LIGHT TRAP FOR A LASER-BASED FIBER OPTIC VEHICLE LIGHTING SYSTEM

FIELD OF THE INVENTION

The present invention relates to laser-based fiber optic vehicle lighting systems, and more specifically, to a light trap for such systems.

BACKGROUND OF THE INVENTION

Conventional light systems, used for vehicle head lights or tail lights, typically use a bulb and reflector system. In a bulb and reflector system, the filament of the bulb is placed at or near a focal point of a parabolic reflector. The light emitted by the bulb filament is collected by the reflector and reflected outward to form a light beam. A lens may be used to shape the light beam into a specified pattern.

The conventional bulb and reflector systems have several disadvantages. For example, bulb and reflector systems collect and often reflect only thirty percent of the light emitted from the bulb filament into the useful lighting area. Additionally, thermal energy given off by the bulb during operation must be considered. The size of the reflector as well as the material used in its construction vary depending upon the amount of thermal energy generated by the bulb filament. Decreasing the size of the reflector requires use of materials with high thermal resistivity for the reflector. Further, bulb and reflector systems have disadvantages related to aerodynamics and aesthetics. For example, the depth of the reflector along its focal axis and the height of the reflector in directions perpendicular to the focal axis greatly limit attempts at streamlining vehicle contours.

An approach to develop an automotive lighting system directed at remedying the above disadvantages and for use with the newer streamlined vehicle contours is proposed in U.S. Pat. No. 5,434,754, assigned to the assignee of the present invention. Therein disclosed is the combination of a fiber optic light guide which transmits light from a remote light source, to a parabolic reflector, through a light manifold, and to a thin sheet optical element. The light guide is optically connected to the remote light source, the optical element, and sometimes to other light guides.

Certain advancements to such an approach have been directed at reducing the thickness of the thin sheet optical element. One way of accomplishing this reduction is by utilizing a high brightness remote light source. One approach is to provide a remote diode laser light source in combination with reduced diameter fiber optic light guides and reduced thickness optical elements. U.S. application Ser. No. 08/780,034, assigned to the assignee of the present invention, is exemplary of such an approach.

Utilization of a light management system as described will necessarily require system assembly and maintenance. The fiber optic light guides will need to be connected to the remote diode laser source, the thin sheet optical element, and potentially to other light guides. Further, the fiber optic light guides may deteriorate over time and may need to be disconnected and replaced. During such procedures the escape of laser light at the connection points is a condition to be avoided.

It is therefore desirable, particularly when using diode laser remote lighting systems, to provide for prevention of emission of laser light at the connection points, especially during system assembly or maintenance.

SUMMARY OF THE INVENTION

Responsive to the deficiencies in the prior art, a fiber optic light guide for a vehicle lighting system has a light transmissive core having a longitudinal axis, an axis perpendicular to and intersecting the longitudinal axis, and a predetermined index of refraction, and a light absorptive cladding provided circumferentially about and longitudinally coextensive with the light transmissive core. The light transmissive core having a surface containing the perpendicular axis and canted about the perpendicular axis a predetermined distance thereby forming an angled planar first end surface of a first end portion. The first end surface, in a first condition, is mated with a parallel second end surface of a second end portion. In a second condition the first end surface is exposed to surrounding air thereby creating an air/core interface having a predetermined critical angle associated therewith.

According to a feature of the present invention, the first end surface is angled a predetermined degree greater than the critical angle.

In a preferred embodiment of the present invention the fiber optic light guide includes a connector having a first and second attachable portions, the first portion circumferentially engaging the first end portion at a predetermined circumferential orientation relative to the first end surface and the second portion circumferentially engaging the second end portion at a predetermined circumferential orientation relative to the parallel second end surface and the first portion so that when the first and second portions are attached the angled planar first and second end surfaces are aligned and mated.

An advantage of the present invention is the angle of the first end surface. When the first and second end surfaces are connected light is transmitted from the first end portion to the second end portion and when the first and second end surfaces are disconnected light is totally internally reflected off the first end surface and into the light absorptive cladding, thereby internally trapping the light within the light guide. This prevents the emission of laser light beyond the confines of the system when connecting or disconnecting the light guides.

BRIEF DESCRIPTION OF THE DRAWINGS

Other features and advantages of the present invention will become apparent to those skilled in the automotive vehicle lighting arts upon reading the following description with reference to the accompanying drawings, in which.

DETAILED DESCRIPTION OF THE PREFERRED EMBODIMENT

Figure 1:
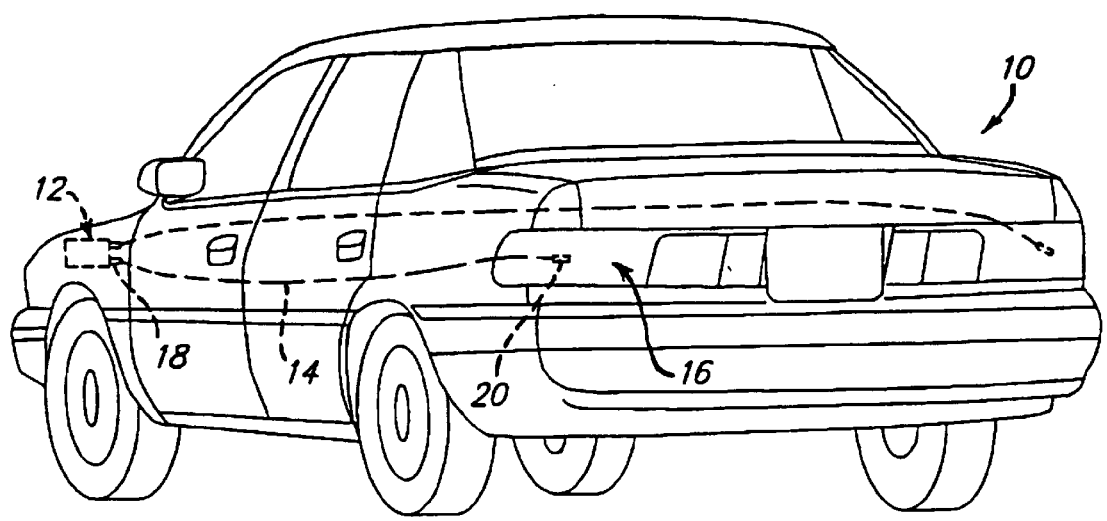
FIG. 1 is a perspective view of an automotive vehicle having a remote light source lighting system.

Turning now to the drawings, and in particular to FIG. 1 thereof, an automotive vehicle 10 is shown having a vehicle lighting system including, a remote diode laser light source 12, a fiber optic light guide 14, and an optical element 16. The optical element 16 is preferably a uniform thickness thin sheet and is here shown as a tail lamp. The fiber optic light guide 14 has a first end 18 optically connectable to the remote laser light source 12 and a second end 20 optically connectable to the optical element 16.

Turning now to FIGS. 2–5, the fiber optic light guide 14 is illustrated as having a light transmissive core 22 and an outer, light absorptive cladding 24.

Figure 5:
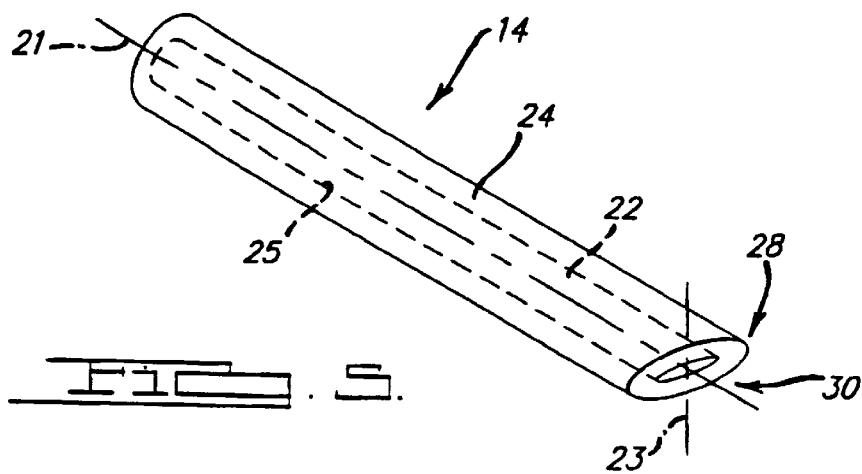
FIG. 5 is a perspective view of a fiber optic light guide according to the present invention.

The light transmissive core 22 is preferably formed of glass fiber having a refractive index of 1.5. The core 22 has a coating 25 which has an index of refraction lower than the core 22. The contact area between the core 22 and the coating 25 is a core/coating interface. The core/coating interface has a predetermined critical angle explained in more detail below associated therewith which is dependent upon the respective indices of refraction of the core 22 and coating 25. For illustrative purposes it is assumed that the coating 25 has a refractive index of 1.44 and therefore the core/coating interface critical angle is 74 degrees. As shown in FIG. 5, the core 22 has a longitudinal axis 21 and an axis 23 perpendicular to and intersecting the longitudinal axis 21.

The outer cladding 24 is composed preferably of a light absorbing polymeric material. The cladding 24 circumferentially overlies and is axially coextensive with the core 22.

Figure 2:
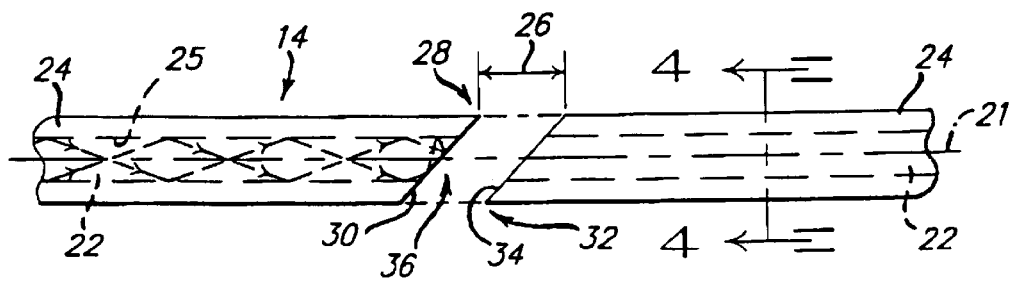
FIG. 2 is a side view of a disconnected fiber optic light guide according to the present invention.
Figure 3:
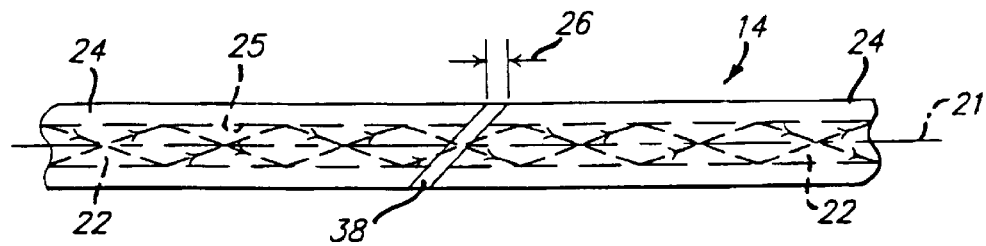
FIG. 3 is a side view of a connected fiber optic light guide according to the present invention.
Figure 4:
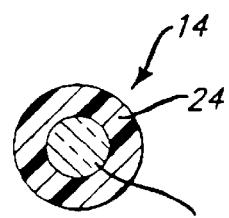
FIG. 4 is a sectional view of the fiber optic light guide of FIG. 2 taken along the line 4—4.
Figure 6:
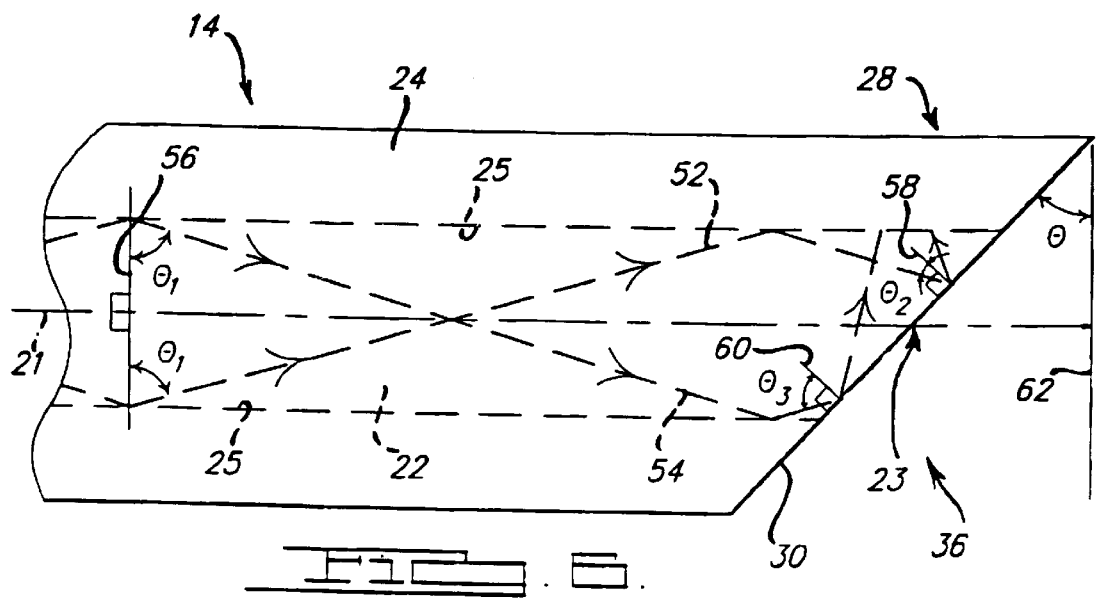
FIG. 6 is a close-up view of the first end portion of a fiber optic light guide according to the present invention.

As shown in FIGS. 2 and 3, the fiber optic light guide 14 has a connection point 26, indicated generally at 26. At the connection point 26 the light guide 14 has a first end portion 28, having a planar surface containing the axis 23, as shown in FIG. 5, and canted about the axis 23 a predetermined distance thereby forming an angled planar first end surface 30. The end surface 30 may also be curvilinear without departing from the scope of the present invention. The first end surface 30 forms a predetermined angle θ, as shown in FIG. 6, with respect to a plane 62 perpendicular to the longitudinal axis 21 and containing the axis 23. The light guide 14 further has a second end portion 32, having a second end surface 34 parallel to and matable with the first end surface 30.

As shown in FIG. 2, in a second condition prior to light system assembly or during system maintenance, the end surfaces, 30 and 32, are disconnected. This creates an air/core interface 36 at the end surfaces, 30 and 32, with the surrounding air. The index of refraction of air is 1.0. The critical angle associated with the air/core interface 36, assuming the aforementioned preferred core 22 material, is 42 degrees.

As shown in FIG. 3, in a first condition the end surfaces, 30 and 32, are aligned and mated together. If the end surfaces, 30 and 32, are not mated properly there may be one or more air gaps between the end surfaces, 30 and 32. These gaps will adversely affect light transmitance through the connection point 26. Therefore, it is preferred that there is a continuous and uniform index of refraction at the connection point 26 to facilitate light transmitance therethrough. Thus, the mating of end surfaces, 30 and 32, is preferably done with an adhesive 38 having an index of refraction equivalent to the light transmissive core 22.

In use, light is emitted from the remote laser light source 12 and received by the core 22 of the fiber optic light guide. The spread angle of the light received by the core 22 of the fiber optic light guide 12 yields a number of light rays each propagating at a certain angle with respect to the longitudinal axis 21 of the core 22. Light is transmitted down the length of the core 22 via total internal reflection ("TIR").

TIR of light occurs when an incident angle θ exceeds a critical angle $\theta_c$ given by the equation $\theta_c = \sin^{-1}(n_2/n_1)$ wherein $n_1$ is the index of refraction of the material through which light is propagating, the core 22 in the present invention, and $n_2$ is the index of refraction of the surrounding medium, the coating 25 in the present invention, and $n_2$ is less than $n_1$. Light rays striking the core/coating interface at an angle greater than the critical angle, 74 degrees in the present invention, propagate down the length of the core 22 by repeatedly striking and totally internally reflecting off the core/coating interface.

As the light propagating down the length of the light guide 14 encounters a connection point, the light will behave in one of two ways. In the first condition, the end surfaces, 30 and 34, are connected or separated by a substance, such as an index matching adhesive 38. The light passes through the connection point 26 unimpeded due to the continuous indices of refraction. In the second condition, the end surfaces, 30 and 34, are disconnected and the light strikes the air/core interface 36 at the end surface 30 at a predetermined angle, explained in more detail below, greater than the critical angle associated with the air/core interface 36. The light is totally internally reflected into the light absorptive cladding 24 thereby trapping the light within the light guide 14. Trapping the light within the light guide when the end portions, 28 and 32, are separated is advantageous because laser light will not be inadvertently released during light system maintenance or assembly.

Referring to FIG. 6, the second condition is shown and the end surface 30 is exposed to the air. As mentioned, all light rays propagating at angles, with respect to the longitudinal axis 21, greater than the critical angle will totally internally reflect off of the core/coating interface, and propagate down the length of the core 22 until reaching the end surface 30. Exemplary of such are a first and second ray, 52 and 54 respectively. The rays, 52 and 54, are at an angle θ1, with respect to a normal 56 of the longitudinal axis 21, greater than the critical angle of 74 degrees for the core/coating interface. The first ray 52, and all light rays propagating at an angle greater than θ1, are internally reflected at the first end surface 30, and thereby trapped within the light guide 14, by striking the first end surface 30 at an angle θ2. The angle θ2 is an angle with respect to a normal 58 of the first end surface 30, greater than the critical angle of 42 degrees associated with the air/core interface 36. The angle θ2 with respect to the first ray 52 is equal to θ+θ1−90 degrees. By setting θ2 equal to the critical angle of the air/core interface 36, and θ1 equal to the critical angle of the core/coating interface, θ is thereby derived to be 58 degrees. In the preferred case, the end surface 30 must be canted greater than 58 degrees in order for the light rays to be totally internally reflected off the end surface 30 when exposed to air. Turning to the second ray 54, θ3 is equal to 90 degrees−θ1+θ. The angle θ equals 58 degrees and θ1 equals 74 degrees, therefore θ3 is derived to be 74 degrees. The angle θ3 thus exceeds the air/core interface 36 critical angle of 42 degrees and will be totally internally reflected into the cladding.

Figure 7:
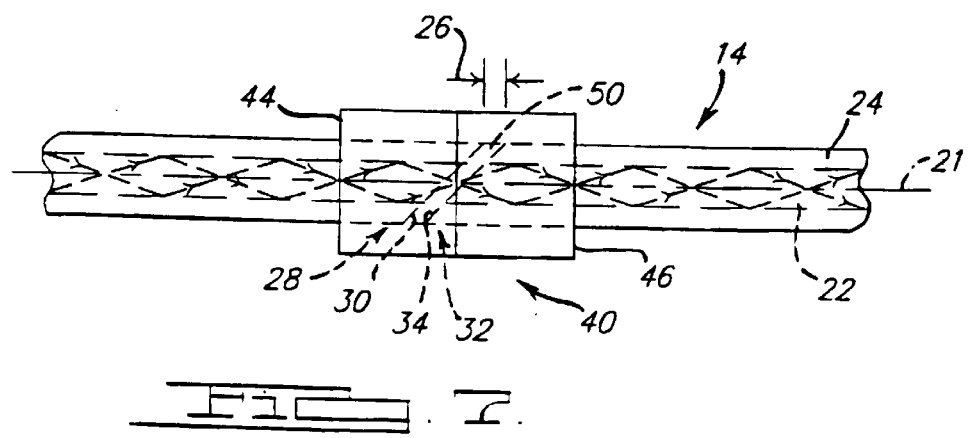
FIG. 7 is a side view of a fiber optic light guide having a connector according to an alternative embodiment of the present invention.

Turning now to FIG. 7, an alternative embodiment of a fiber optic light guide 14 is indicated as further having a connector 40. The connector 40 has a first portion 44 attachable to a second portion 46. The attachment may be accomplished by conventional attachment means as known in the art. The first portion 44 is circumferentially attached and preferably in a hermetically sealed relationship to the first end portion 28 of the fiber optic light guide 14. The second portion 46 is circumferentially attached and preferably in a hermetically sealed relationship to the second end portion 32 of the light guide 14. The connector portions, 44 and 46, are preferably attached to the end portions, 28 and 32, of the light guide 14 in a relative circumferential orientation with respect to the light guide's 14 longitudinal axis 21 so that when the first and second portions, 44 and 46, are connected, the end surfaces, 30 and 34, are aligned and mated. Preferably, a gel 50 or adhesive having an index of refraction equivalent to the light transmissive core 22 is applied to the first and second end surfaces, 30 and 34 respectively, prior to engagement of the attachment mechanism 48.

Utilization of a connector 40 is advantageous because it facilitates assembly of the end portions, 28 and 32, and prevents the end surfaces, 30 and 34, from becoming contaminated with dust. Utilization of an index matching gel 50 or adhesive is advantageous because it ensures a continuous index of refraction at the connection point 26 thereby facilitating transmission of light through the end surfaces, 30 and 34.

Only two embodiments of a fiber optic light trap for a vehicle lighting system of the present invention have been described. Those skilled in the automotive lighting arts will appreciate that others may be possible without departing from the scope of the following claims.

We claim:

1. A fiber optic light guide for a vehicle lighting system, comprising:
 a light transmissive core having a longitudinal axis, an axis perpendicular to and intersecting the longitudinal axis, and a predetermined index of refraction;
 a light absorptive cladding provided circumferentially about and longitudinally coextensive with the light transmissive core; and
 the light transmissive core having a surface containing the axis and canted about the axis a predetermined distance thereby forming an angled first end surface, the first end surface in a first condition connected to and mated with a second end surface, in a second condition the first end surface is exposed to surrounding air thereby creating an air/core interface having a predetermined critical angle.

2. The fiber optic light guide of claim 1, wherein the angled first end surface is angled a predetermined degree greater than the critical angle, so that when, in the first condition, the angled first and second end surfaces are mated light is transmitted from the parallel first end surface to the angled second end surface and when, in the second condition, the angled first and second end surfaces are separated light is totally internally reflected off the angled first end surface and into the light absorptive cladding.

3. The fiber optic light guide of claim 1, wherein the angled first end surface is mated to the parallel second end surface with an adhesive having an index of refraction matching the light transmissive core, thereby facilitating light transmission from the first end surface to the second end surface.

4. The fiber optic light guide of claim 1, wherein the light transmissive core is a glass fiber.

5. A fiber optic light guide for a vehicle lighting system, comprising:
 a light transmissive core having a longitudinal axis, an axis perpendicular to and intersecting the longitudinal axis, and a predetermined index of refraction;
 a light absorptive cladding provided circumferentially about and longitudinally coextensive with the light transmissive core;
 the light transmissive core having a first end portion having a surface containing the axis and canted about the axis a predetermined distance thereby forming an angled first end surface, the first end surface in a first condition connected to and mated with a second end surface of a second end portion, in a second condition the first end surface is exposed to surrounding air thereby creating an air/core interface having a predetermined critical angle; and
 a connector having a first portion attachable to a second portion, the first portion circumferentially engaging the first end portion at a predetermined circumferential orientation relative to the first end surface and the second portion circumferentially engaging the second end portion at a predetermined circumferential orientation relative to the angled second end surface and the first portion so that when the first and second portions are attached the angled first and second end surfaces are symmetrically mated.

6. The fiber optic light guide of claim 5, wherein the angled first end surface is angled a predetermined degree greater than the critical angle, so that when, in the first condition, the angled first and second end surfaces are mated light is transmitted from the first end surface to the angled second end surface and when, in the second condition, the angled first and second end surfaces are separated light is totally internally reflected off the angled first end surface and into the light absorptive cladding.

7. The fiber optic light guide of claim 5, wherein the angled first and second end surfaces are coated with a gel, having an index of refraction matching the light transmissive core, prior to being symmetrically mated thereby facilitating light transmission from the first portion to the second portion.

8. The fiber optic light guide of claim 5, wherein the first portion circumferentially engaging the first end portion is attached to the second portion circumferentially engaging the second end portion in a hermetically sealed relationship.

9. The fiber optic light guide of claim 5, wherein the light transmissive core is a glass fiber.

10. A vehicle lighting system, comprising:
 a remote light source;
 an optical element; and
 a fiber optic light guide, including:
  a light transmissive core having a longitudinal axis, an axis perpendicular to and intersecting the longitudinal axis, and a predetermined index of refraction;
  a light absorptive cladding provided circumferentially about and longitudinally coextensive with the light transmissive core;
  the light transmissive core having a first end portion having a surface containing the axis and canted about the axis a predetermined distance thereby forming an angled first end surface, the first end surface in a first condition connected to and mated with a second end surface of a second end portion, in a second condition the first end surface is exposed to surrounding air thereby creating an air/core interface having a predetermined critical angle; and
  a connector having a first portion, a second portion, and an intermediately located attachment means, the first portion circumferentially engaging the first end portion at a predetermined circumferential orientation relative to the angled first end surface and the second portion circumferentially engaging the second end portion at a predetermined circumferential orientation relative to the second end surface and the first portion so that when the first and second portions are attached the angled first and second end surfaces are symmetrically mated.

11. The vehicle lighting system of claim 10, wherein the angled first end surface is angled greater than the critical angle, so that when, in the first condition, the angled first and second end surfaces are mated light is transmitted from the angled first end surface to the second end surface and when, in the second condition, the angled first and second end surfaces are separated light is totally internally reflected off the angled first end surface and into the light absorptive cladding.

12. The fiber optic light guide of claim 10, wherein the angled first and second end surfaces are coated with a gel, having an index of refraction matching the light transmissive core, prior to being symmetrically mated thereby facilitating light transmission from the first portion to the second portion.

13. The fiber optic light guide of claim 10, wherein the first portion circumferentially engaging the first end portion is attached to the second portion circumferentially engaging the second end portion in a hermetically sealed relationship.

14. The fiber optic light guide of claim 10, wherein the light transmissive core is a glass fiber.

15. The fiber optic light guide of claim 10, wherein the optical element is a uniform thickness thin sheet.

16. The fiber optic light guide of claim 10, wherein the remote light source is a diode laser.

* * * * *